United States Patent [19]

Nimberger

[11] Patent Number: 5,725,024
[45] Date of Patent: Mar. 10, 1998

[54] MANIFOLD VALVE HAVING CONTROLLED VENT PORT INTEGRAL WITH FLANGE

[75] Inventor: Spencer M. Nimberger, Houston, Tex.

[73] Assignee: PGI International, Ltd., Houston, Tex.

[21] Appl. No.: 697,260

[22] Filed: Aug. 21, 1996

Related U.S. Application Data

[60] Provisional application No. 60/003,519 Sep. 11, 1995.

[51] Int. Cl.$^6$ ........................................... F17D 1/00
[52] U.S. Cl. ........................................ 137/597; 137/884
[58] Field of Search ................................ 137/552, 594, 137/597, 884

[56] References Cited

U.S. PATENT DOCUMENTS

| | | |
|---|---|---|
| 3,450,157 | 6/1969 | Hewson . |
| 4,672,728 | 6/1987 | Nimberger ................ 137/884 |
| 4,711,268 | 12/1987 | Coleman ................ 137/597 |
| 5,277,224 | 1/1994 | Hutton et al. ............ 137/597 |

OTHER PUBLICATIONS

Product Data Sheet, *PDS* 4001A00, Mar. 1995, Rosemount.
Product Data Sheet, *PDS* 2001, Sep. 1992; Rosemount.
Product Data Sheet, *The CM30 Series*—Century Valve and Huber Flow Control; Huber Flow Control Division, Tomball, TX.
Product Data Sheet, *Power & Steam Plant Valves & Manifolds*, Precision General Inc.

Primary Examiner—Denise L. Ferensic
Assistant Examiner—Ramyar Farid
Attorney, Agent, or Firm—Jenkens & Gilchrist, P.C.

[57] ABSTRACT

A manifold valve has a pair of inlet ports and a pair of outlet ports with separate passageways extending separately between a respective inlet port and a respective outlet port of the pair. The manifold valve has a body portion in which a plurality of valves are disposed for controllably directing and selectively blocking the flow between selected inlet and outlet ports. The manifold valve also has a flange portion that is integrally formed with the body portion and has a means disposed therein for selectively providing a separately modulated flow path between each of the internal passageways and an environment external of the manifold valve.

1 Claim, 3 Drawing Sheets

MANIFOLD VALVE HAVING CONTROLLED VENT PORT INTEGRAL WITH FLANGE

This application claims priority of provisional patent application Ser. No. 60/003,519, filed Sep. 11, 1995.

BACKGROUND OF THE INVENTION

1. Field of the Invention

This invention relates generally to manifold valves and more particularly to manifold valves having defined body and flange portions formed as an integral structure.

2. Description of Related Art

Manifold valves are commonly used in fluid process systems in conjunction with measurement instruments such as pressure transmitters. For example, pressure transmitters are typically used to sense the pressure drop across a controlled orifice and transmit a signal representative of the sensed pressure on each side of the orifice to a data acquisition system, such as a computer. Very small errors in the measured value of the respective pressures can produce significant error in a calculated fluid flow rate. It has been found that excessive length of the fluid flow path from the orifice to the sensor, and poor calibration of the sensor, are major contributors to erroneous pressure measurements. Therefore, it is desirable that the pressure sensor be positioned as close as feasible to the source of the measured pressure, and that the measuring instrument itself be frequently calibrated to assure the sensing and transmittal of correct pressure values.

Heretofore, directionally uncontrolled-flow vent valves were provided in one or more walls in the body of a manifold and communicated, respectively and separately, with each of the internal passageways extending between the inlet and outlet ports. The prior vent valves typically had an unsealed stem that could be loosened to permit fluid to escape around the stem to the external environment. Such valves were incapable of controllably directing the flow of fluid to a port that could be connected with a pipe or tubing adapter.

In many applications, such as in the chemical and petroleum processing and petroleum refining industries, the sensed fluids are often highly toxic, flammable, or otherwise hazardous. It is therefor highly undesirable to uncontrollably drain, or dump, such fluids by opening a valve stem and discharging the pressurized fluid to the environment.

In Europe, wafer-type five valve manifolds, such as the valve described in U.S. Pat. No. 5,277,224 have been used to mount measurement instruments. The wafer valve, and similar sandwich-type multiple valve manifolds, are not suitable for use in many applications because of the inherent difficulty of attaching ovate flange adapters, commonly known as "footballs", to provide connection to a threaded pipe. Also, it is difficult to mount such valves between a flanged element of the pressurized fluid processing system and the flanged base of the measurement instrument. Typically, bolts may extend from one flange, through the valve, to the opposite flange. In this arrangement, it is easy to see that when the bolts are removed, for example to remove the measurement instrument for service or repair, the interconnection between the valve and the process lines communicating with the inlet ports is also opened to atmosphere. Thus, unless additional blocking valves were previously installed between the process system and the instrument-supporting wafer or sandwich valve, the entire process system must be drained or vented prior to removing the measurement instrument.

The present invention is directed to overcoming the problems set forth above. It is desirable to have a manifold valve with directionally controlled vent passages, and from which valve a measurement instrument can be removed for repair or replacement without exposing the process system to atmosphere. It is also desirable to have a manifold valve wherein the vent passage drainage or venting can be controllably directed to a port connected to a conduit so that the drained fluid can be suitably conveyed to an appropriate disposal apparatus, such as a burn-off vent. It is also desirable to have the vent ports positioned as closely as possible to the measuring instrument to eliminate undesirable structure between the atmosphere and sensing elements in the instrument to assure consistently accurate calibration of the instrument.

SUMMARY OF THE INVENTION

In accordance with one aspect of the present invention, a manifold valve has a pair of inlet and outlet ports with passageways extending through the valve and connecting each one of the pair of inlet ports with a respective one of the pair of the outlet ports. The manifold valve also has a body portion that has a plurality of valves that controllably direct and selectively block fluid flow between the inlet and outlet ports. Further, the manifold has a flange portion that is integrally formed with the body portion and has an external surface in which the outlet ports are formed and which is also adapted to detachably support a measuring instrument. The manifold valve includes means disposed within the flange portion for selectively providing a modulated fluid flow path from each of the outlet ports to an environment external of the manifold valve.

In other aspects of the present invention, the means disposed within the flange for selectively providing a modulated fluid flow path from each of the outlet ports includes a pair of vent ports formed in a surface of the flange portion at a position spaced from the outlet ports. The means also includes a pair of vent passages disposed within the flange portion, each of which extend from separate ones of the pair of outlet ports to respectively separate ones of the pair of vent ports, and a pair of flow control valves each separately disposed in fluid flow-blocking relationship with each of the vent passages.

DESCRIPTION OF THE PREFERRED EMBODIMENT

Figure 1:
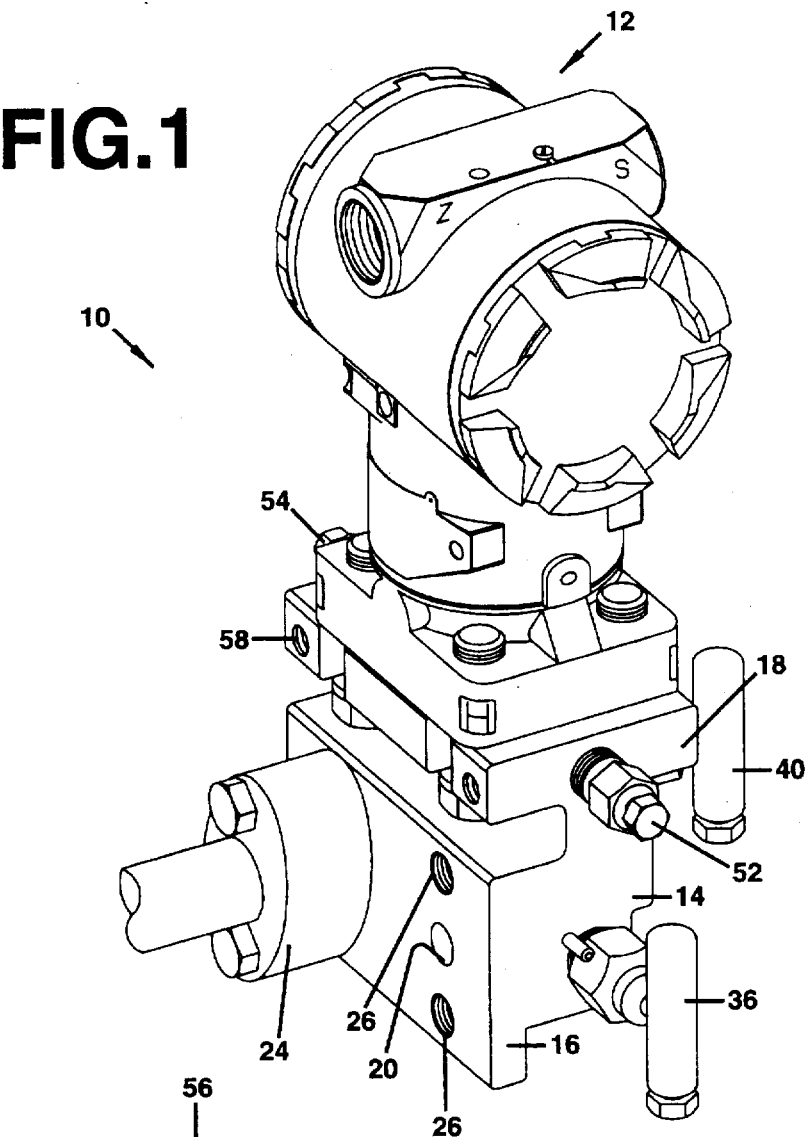
FIG. 1 is a perspective view of the manifold valve embodying the present invention, viewed from the process flange side of the valve with a pressure transmitter mounted on the instrument flange of the valve.

A manifold valve 10 embodying the present invention is shown in the drawings in a typical application in which a measuring instrument, such as a pressure transmitter 12 is detachably mounted on the manifold valve 10. In such applications, the pressure transmitter 12 is used to measure the pressure drop of a fluid flowing across an orifice, not shown. For this purpose, the manifold valve 10 has two controllable primary flow paths through the valve.

Figure 4:
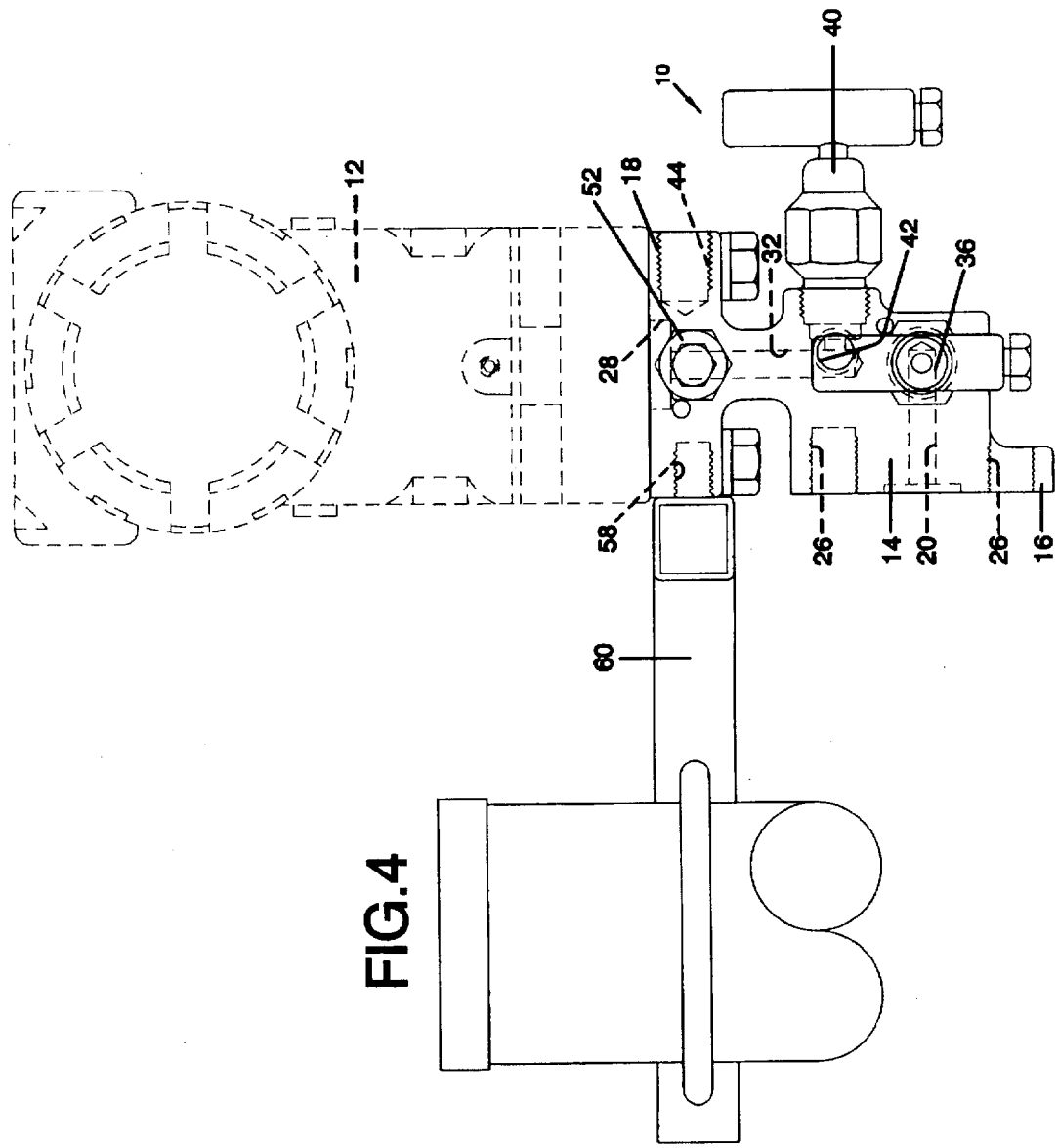
FIG. 4 is a side view of the manifold valve embodying the present invention, showing the manifold valve attached to a pipe bracket.

The manifold valve 10 is preferably formed by machining an extruded shape having an external profile shape as shown in the side view of FIG. 4. If the manifold valve 10 is to be used in fluid systems containing corrosive liquids or gases, it is preferably formed of stainless steel or similar corrosion-resistant material.

As can be best seen in FIG. 4, the manifold valve 10 has a central body 14, a vertically disposed process flange portion 16, and a horizontally disposed instrument flange portion 18. In this embodiment, the flange portions 16,18 are arranged to provide a 90° turn of the primary flow path between the inlet and outlet ports. Alternatively, depending on the particular application requirements, the process flange portion 16 may be disposed in parallel relationship with the instrument flange portion 18, with the primary internal flow paths providing an essentially vertical flow path between the inlet and outlet ports.

The manifold valve 10 has a first inlet port 20 and a second, laterally spaced, inlet port 22, both of which are formed at the surface of a process flange 16. The inlet ports 20,22 may be threaded to accept pipes having conventional (NPT) threads, threaded tubing adapters, or as shown in FIG. 1, a flange adapter 24, commonly referred to as a football. The football 24 has an inner surface adapted to mate with the surface of the process flange 16. The interface is sealed by a conventional O-ring disposed in a groove formed in the surface of the football adapter 24. The outer surface of the football 24 has a threaded port to receive a pipe or tubing adapter and is secured, as shown in FIG. 1, to the manifold valve 10 by a pair of bolts which are threadably received in threaded holes 26 provided in the process flange 16.

A pair of outlet ports, i.e., a first outlet port 28 and a second outlet port 30, are appropriately provided at the surface of the instrument flange 18 at a spaced distance from each other in accordance with the inlet port requirements of the measuring instrument 18. The manifold valve 10 has a first passageway 32 extending through the body portion 14 and the flange portions 16,18, and interconnect the first inlet port 20 with the first outlet port 28 such that the two ports are in fluid communication with each other. Likewise, the manifold valve 10 has a second passage 34 that extends through the body portion 14 and the flange portions 16,18, and interconnects the second inlet and outlet ports 22,30.

The body portion 14 of the manifold valve 10 also provides a housing for a plurality of valves that controllably direct and selectively block fluid flow between the respective inlet and outlet ports. More specifically, a first isolation, or blocking, valve 36 is disposed in the body portion 14 at a position whereat it can controllably block the first passageway 32 and thereby modulate or block the flow of fluid between the inlet and outlet ports 20,28. In a similar manner, a second isolation, or blocking, valve 38 is positioned so that it can controllably modulate or block the flow of fluid through the second passageway 34. A crossover valve 40 is positioned so that it can controllably block the flow of fluid through a crossover passageway 42 communicating with both first and second passageways 32,34. The operation and function of the above described isolation and crossover valves will be described in more detail below.

Figure 3:
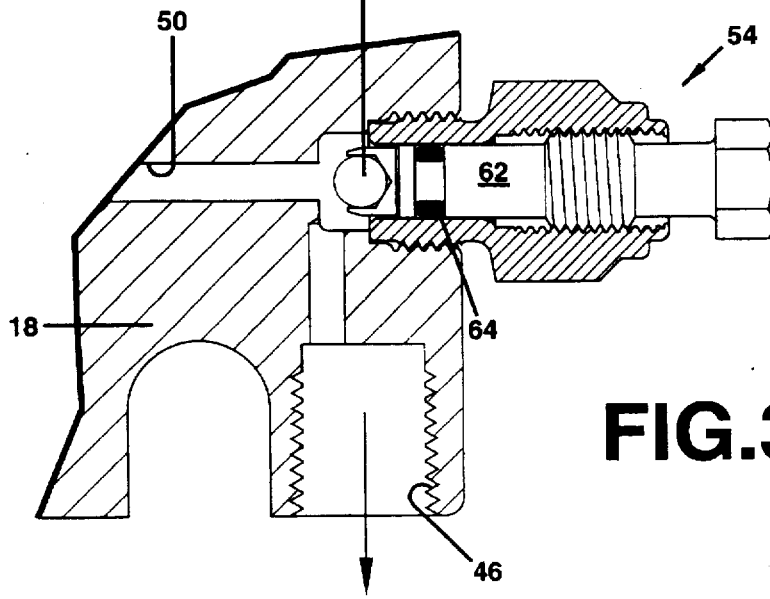
FIG. 3 is a top view of the manifold valve embodying the present invention, taken along the line 3—3 of FIG. 2, with the body of one of the vent valves shown in section.
Figure 2:
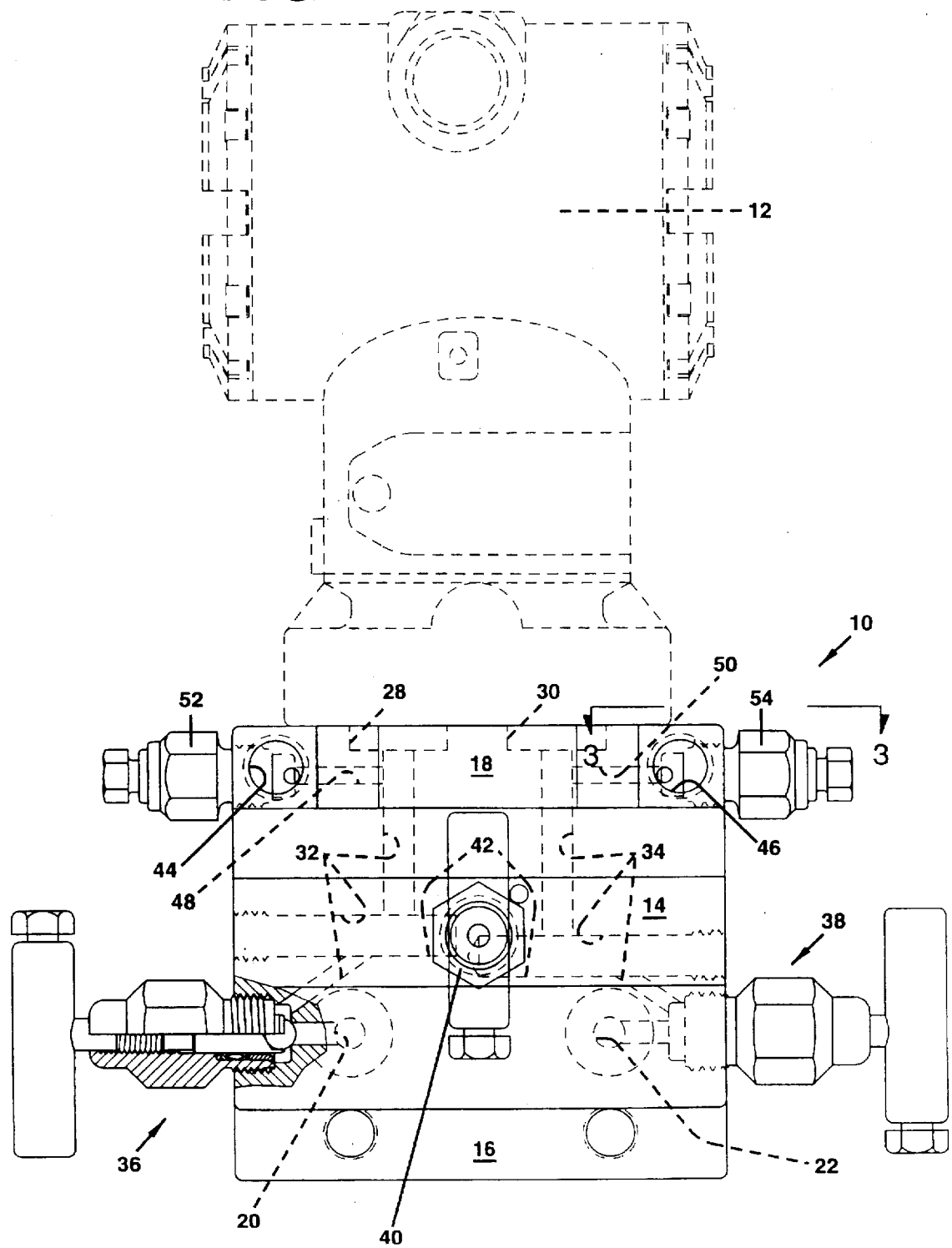
FIG. 2 is frontal view of the manifold valve embodying the present invention with a portion of the valve body and one of the isolation valves shown in partial section.

Importantly, a means for selectively providing a modulated fluid flow path from each of the outlet ports 28,30 to an environment external of the manifold valve 10 is disposed within the instrument flange portion 18 of the manifold valve 10. The term "an environment external of the manifold valve", as used herein, generally refers to an appropriate disposal apparatus, such as a dedicated drain system, a collection tank, or a burn-off vent. The means for selectively providing the modulated fluid flow from each of the outlet ports 28,30 includes first and second vent ports 44,46 that are formed in a surface of the instrument flange portion 18 other than the surface containing the outlet ports 28,30. Desirably, the first and second vent ports 44,46 are threaded so that a pipe, or more typically, a tubing adapter can be attached to each of the vent ports 44,46. A first vent passage 48, wholly disposed within the instrument flange portion 18, interconnects the first passageway 32 with the first vent port 44. In similar fashion, a second vent passage 50 is also wholly disposed within the instrument flange portion 18 and interconnects the second passageway 34 with the second vent port 46. Flow through each of the vent passages 48,50 is respectively controlled by first and second vent control valves 52,54 that are also disposed in the corresponding one of the first or second vent passages 48,50 within the instrument flange portion 18 of the manifold valve 10. As best shown in FIG. 3, the vent control valves 52,54 each have a ball closure element 56 disposed on the distal end of a moveable stem 62. Importantly, the stem 62 is sealed by an O-ring 64 to prevent the uncontrolled venting, or leakage, of fluid around the stem. The ball closure element 56, when at the closed position, is seated in blocking relationship in the respective internal vent passage 48,50. Movement of the ball closure elements 56 into and out of the blockage position with respect the vent passage controllably directs the flow of fluid from the respective vent passage 48,50 to the corresponding vent port 44,46.

If desired, a pair of threaded mounting holes 58 may be provided in the instrument flange portion 18 to receive the mounting bolts of a bracket, such as the pipe mount bracket 60 shown in FIG. 4. The pipe mount bracket 60 provides a convenient arrangement for mounting the 90° manifold valve 10 described above.

In operation, the manifold valve 10 is used to selectively control the flow of fluid from two, different, predefined flow areas of the fluid flow system to the measurement instrument 12. In normal operation, each of the isolation valves 36,38 are open, the pressure of the fluid from each predefined source is directed to the pressure transmitter, typically having two chambers separated by a flexible diaphragm, and the respective pressures and the differences in those pressures, commonly referred to as ΔP, is determined and transmitted to a designated readout or recording device by the measurement instrument.

To assure that the respective pressure and ΔP values are accurate, it is essential that the measurement instrument be periodically checked, and if not correct, be recalibrated. For example, a measurement instrument such as the pressure transmitter 12 described above is typically calibrated to set both the null, or zero, value and the range, or span, values of the transmitted signal. In carrying out nulling or "zeroing" of the instrument, one of the isolation valves 36,38 is closed and the other opened to the pressurized process system. The crossover valve 40 is then opened so that equal pressure is provided to both outlet ports 28,30 and, consequently, to both chambers of the pressure transmitter 12. Under these conditions, the ΔP output signal of the pressure transmitter 12 should be zero. If other than a zero value is produced, the instrument is adjusted to produce the zero value. The instrument is then spanned to check the instrument at a known pressure. This procedure is carried out by closing both of the isolation valves 36,38 and the crossover valve 40, and opening both of the vent control valves 52,54. A known test pressure, typically representative of the operational pressure of the process system, is introduced through one of vent ports 44,46 with the other vent port remaining open to atmosphere. The ΔP output signal of the pressure transmitter should correspond with the applied known pressure, and if not, adjusted so that it does. Typically, the zero and span adjustments are somewhat interdependent in that the adjustment of one will slightly affect the other. For that reason, the zero and span calibration steps are usually repeated until both deliver accurate output signals without adjustment.

Importantly, in carrying out the above calibration steps, it can be easily understood that fluid from the system and instrument must necessarily be drained, or discharged, from the vent passages 48,50. Heretofore, the vent passages in manifold valves of the type embodying the present invention were typically positioned in the valve body and were opened by venting around the stem of a closure valve disposed in an opening communicating with the vent passage. Consequently, fluid from the process system leaked or, if under pressure, was expelled with great force from around the stem of the vent valve, striking whatever surface was near at hand. As can be readily appreciated from the above description, the manifold valve 10 embodying the present invention provides an effective remedy for these problems.

Other aspects, features and advantages of the present invention can be obtained from a study of this disclosure along with the appended claims.

What is claimed is:

1. A one-piece integrally formed manifold having a first inlet port, a first outlet port, and a first internally disposed primary flow passageway providing fluid communication between said first inlet and outlet ports; a second inlet port, a second outlet port, and a second internally disposed primary flow passageway providing fluid communication between said second inlet and outlet ports; and all internally disposed crossover passageway providing fluid communication between said first and second primary flow passageways, said manifold consisting of:

a body portion consisting of a front surface, a rear surface, a first and a second side surface, and a bottom surface, wherein said first and second inlet ports are disposed on a preselected one of said rear and bottom surfaces, a first blocking valve mounted on said first side surface and operatively disposed in said body portion at a position whereat said first blocking valve is capable of controllably directing and selectively blocking fluid flow through said first primary flow passageway, a second blocking valve mounted on said second side surface and operatively disposed in said body portion at a position whereat said second blocking valve is capable of controllably directing and selectively blocking fluid flow through said second primary flow passageway, and a crossover valve mounted on said front surface and operatively disposed in said body at a position whereat said crossover valve is capable of controllably directing and selectively blocking fluid flow between said first and second primary flow passageways;

a flange portion integrally formed with said body portion and consisting of a top surface, a front surface disposed in parallel relationship with the front surface of said body portion, a rear surface disposed in parallel relationship with the rear surface of said body portion, a first side surface disposed in coplanar relationship with the first side surface of said body portion, and a second side surface disposed in coplanar relationship with the second side surface of said body portion, said first and second outlet ports being disposed in said top surface, a first vent port and a second vent port being disposed in said front surface of the flange portion and separately configured for connection to a drain conduit, a first vent passage disposed within said flange portion and extending between said first vent port and said first outlet port and a second vent passage disposed within said flange portion and extending between said second vent port and said second outlet port, a first vent port control valve mounted on said first side surface of said flange portion in parallel alignment with said first blocking valve and operatively disposed within said flange portion at a position whereat said first vent port control valve is capable of selectively directing and controllably blocking fluid flow between said first outlet port and said first vent port, and a second vent port control valve mounted on a second side surface of said flange portion in parallel alignment with said second blocking valve and operatively disposed within said flange portion at a position whereat said second vent port control valve is capable of selectively directing and controllably blocking fluid flow between said second outlet port and said second vent port; and a web portion extending between said body portion and consisting of a front surface in parallel alignment with the front surface of said body portion, a rear surface in parallel alignment with the rear surface of said body portion, a first side surface in coplanar alignment with the first side of said body portion, and a second side surface in coplanar alignment with the second side surface of said body portion.

* * * * *

UNITED STATES PATENT AND TRADEMARK OFFICE
CERTIFICATE OF CORRECTION

PATENT NO. : 5,725,024
DATED : March 10, 1998
INVENTOR(S) : Spencer M. Nimberger It is certified that error appears in the above-indentified patent and that said Letters Patent is hereby corrected as shown below:

In claim 4, line 48, insert --, the front and rear surface of the web portion being positioned inwardly with respect to said front and rear surface of the body portion-- after "portion".

In claim 4, line 28, insert --perpendicular to a portion of the first primary flow passageway positioned within the flange portion-- after "portion".

In claim 4, line 36, insert --perpendicular to a portion of the second primary flow passageway positioned within the flange portion-- after "portion".

Signed and Sealed this

Fourth Day of August, 1998

*Attest:*

BRUCE LEHMAN

*Attesting Officer*  *Commissioner of Patents and Trademarks*